Aug. 9, 1955 A. C. McCARTHY 2,714,979
SHOULDER SUPPORTED GRIP FOR WELDING LINE
Filed April 18, 1952
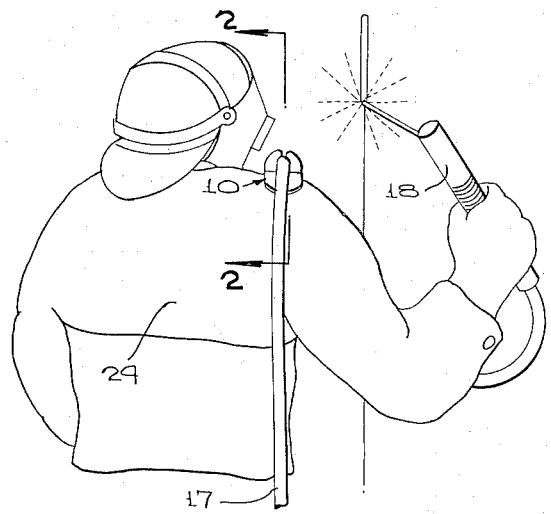
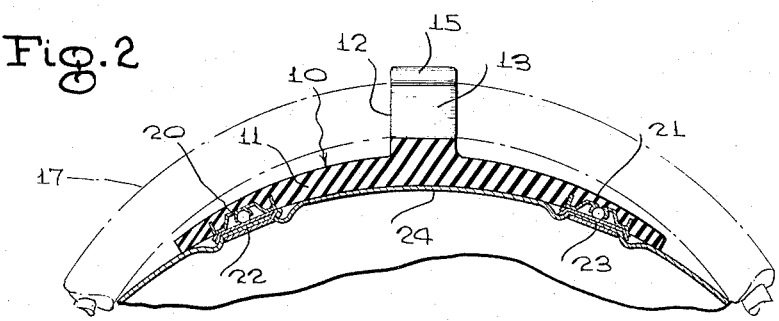
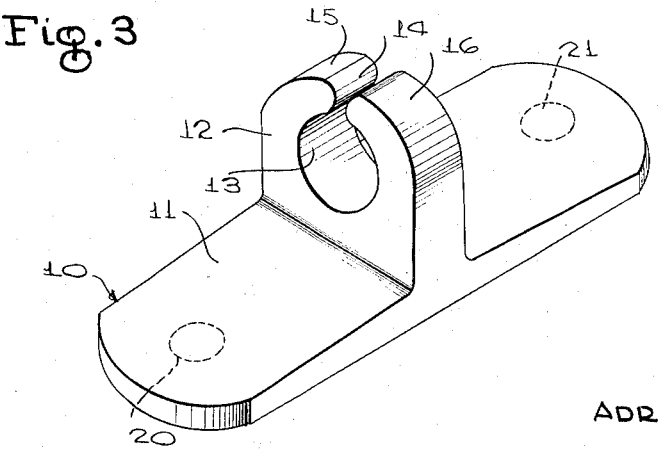
INVENTOR
ADRIAN C. McCARTHY
BY
McMorrow, Berman & Davidson
ATTORNEYS

United States Patent Office 2,714,979
Patented Aug. 9, 1955

2,714,979
SHOULDER SUPPORTED GRIP FOR WELDING LINE

Adrian C. McCarthy, Downey, Calif.

Application April 18, 1952, Serial No. 283,007

4 Claims. (Cl. 224—5)

This invention relates to body supported grips or guides for welding lines, such as the hoses of gas welding devices or the cables of electric welding devices, and more particularly to a device detachably mounted on the shoulder portion of a garment to hold a welding line in place on the shoulder of a welder.

It is among the objects of the invention to provide a welding line grip which can be detachably mounted on a shoulder portion of a welder's garment to hold a welding line on the welder's shoulder while the welder is in different positions and locations necessitated by operating conditions; which releasably grips the welding line so that the line can be placed on or removed from the shoulder as may be necessary and which frictionally grips the line against movement through the grip under the weight of the line while permitting the line to be manually pulled therethrough if necessary; which protects the welder's shoulder from injury and his clothing from excessive wear and damage; which permits the welder to lean or bend to various attitudes without losing the line from his shoulder; and which is simple and durable in construction, economical to manufacture, comfortable to wear, and effective in use.

Other objects and advantages will become apparent from a consideration of the following description and the appended claims in conjunction with the accompanying drawing wherein:

Figure 1 is a somewhat diagrammatic view of a welder showing a line grip illustrative of the invention mounted on the welder's shoulder and supporting a welding line leading to a welding device held in one hand of the welder;

Figure 2 is a longitudinal cross sectional view of the grip taken on the line 2—2 of Figure 1; and Figure 3 is a perspective view of the grip.

With continued reference to the drawing, the grip, as generally indicated at 10, is a body of elastic material, such as vulcanized rubber of a medium or somewhat less than medium hardness and includes a flat base portion 11 of elongated, and substantially rectangular shape, and a lug formation 12 extending transversely of the base portion 11 and extending perpendicularly from the latter substantially at the midlength location of the base portion.

The base portion 11 has straight and substantially parallel side edges and convexly rounded end portions and tapers in thickness from its midlength location to both of its ends.

The lug formation 12 is of elongated, rectangular cross sectional shape having two substantially parallel flat faces which extend transversely of the base portion 11 and has an opening 13 of substantially circular cross sectional shape extending therethrough from one flat face to the other and disposed longitudinally of the base portion. The opening 13 is connected by an extension 14 of restricted size to the edge surface of the lug formation 12 at a location along the edge surface most remote from the adjacent or top surface of the base portion 11 so that the lug formation provides two opposed and inwardly curved jaws 15 and 16 which receive the hose line 17 therebetween.

The hose line can be inserted between or removed from between the jaws 15 and 16 through the opening extension 14, the jaws springing away from each other by reason of the resilient nature of the material of which the device is formed as the line passes through the restricted extension 14 of the opening 13 and the jaws resiliently engage the outer surface of the welding line, as shown in Figure 1, to hold the line in position relative to the grip against the weight of the line. The frictional engagement between the grip and the line is, however, insufficient to prevent movement of the line longitudinally through the lug formation of the grip by manually pulling on the line as may be necessary to adjust the length of the line from the grip to the welding device 18 secured on one end of the line.

Separable fastener elements 20 and 21 are secured in the base portion 11 one near each opposite end of the base portion and at the side of the base portion remote from the lug formation 12. It has been found sufficient to use only two separable fastener elements in the base portion substantially centered along the longitudinal center line of the base portion although additional fastener elements may be used, if found necessary or desirable, without in any way exceeding the scope of the invention.

Snap fastener elements 22 and 23 complementary to the elements 20 and 21 are secured to the shoulder portion of a welder's garment 24 in spaced apart relationship to receive the elements 20 and 21 and detachably secure the grip 10 on the shoulder portion of the garment.

The grip 10 extends across the shoulder of the welder, as shown in Figure 1 with the aperture or opening 13 for the line 17 extending forwardly and rearwardly to receive the line passing over the shoulder of the welder and retain the line on the welder's shoulder while the welder is engaged in a welding operation. As explained above, the line 17 may be a hose for a gas welding device or may be a cable for an electric welding device.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination, a garment having a shoulder portion, an elongated resilient body extending crosswise upon said shoulder portion and conforming in longitudinal curvature to the contour of said shoulder portion, opposed resilient lugs rising from an intermediate part of said body, said lugs having concave facing sides for snugly accommodating a welding hose or the like, and separable fastening means securing said body in place upon said shoulder portion.

2. In combination, a garment having a shoulder portion, an elongated resilient body extending crosswise upon said shoulder portion and conforming in longitudinal curvature to the contour of said shoulder portion, opposed resilient lugs rising from an intermediate part of said body, said lugs having concave facing sides for snugly accommodating a welding hose or the like, and separable fastening means securing said body in place upon said shoulder portion, said fastening means consisting of separable fasteners at the opposite ends of said body.

3. A shoulder support for a welder's line or the like comprising an elongated body of resilient and flexible material, said body having a convex upper side and a concave underside and being tapered to its opposite ends from an intermediate portion of the body, a pair of opposed transversely spaced integral lugs rising from said intermediate portion of the body, said lugs having concave facing sides constituting jaws for resiliently gripping a welder's line or the like disposed therebetween.

4. A shoulder support for a welder's line or the like comprising an elongated body of resilient and flexible material, said body having a convex upper side and a concave underside and being tapered to its opposite ends from an intermediate portion of the body, a pair of opposed transversely spaced integral lugs rising from said intermediate portion of the body, said lugs having concave facing sides constituting jaws for resiliently gripping a welder's line or the like disposed therebetween, and separable fastener components on the underside of said body at the ends thereof.

References Cited in the file of this patent

UNITED STATES PATENTS

| | | |
|---|---|---|
| 1,027,527 | Davis | May 28, 1912 |
| 1,544,303 | Fellows | June 30, 1925 |
| 2,292,140 | Lofgren | Aug. 4, 1942 |
| 2,506,685 | Sadloski | May 9, 1950 |
| 2,540,069 | Winebrenner | Jan. 30, 1951 |
| 2,602,575 | Olson | July 8, 1952 |